Patented Mar. 23, 1948

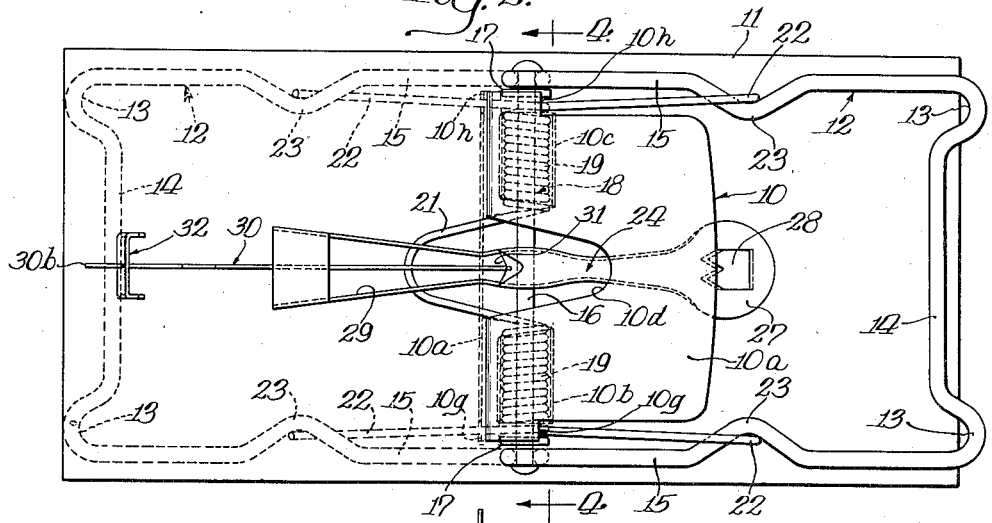

2,438,377

UNITED STATES PATENT OFFICE 2,438,377

BARRIER FOR ANIMAL TRAPS

Herbert A. Stilson, Chicago, Ill., assignor to McGill Metal Products Corporation, Marengo, Ill., a corporation of Illinois Application July 26, 1945, Serial No. 607,152

14 Claims. (Cl. 43—81)

1

The present invention relates to animal traps and more particularly to an improved device adapted for combination with an animal trap to minimize bait stealing.

In animal traps, particularly those used for catching rats and larger animals, the jaw or striker for killing the animal is pivoted intermediate the ends of a base, and is held latched at the rear end of the base ready to pivot under spring tension to a released position at the front end of the base when the latch mechanism is released by pressure on the bait treadle located at the front end of the base. Thus with the trap in set position, the bait treadle is at one end of the base, while the jaw or striker is held latched at the other end of the base. Normally an animal approaches the bait from the front end or the sides of the base adjacent the bait treadle so that when the striker is released the animal is properly positioned to be killed by the striker rotating toward its released position. However, it is not unusual for a larger animal, such as a rat, to approach the bait from the rear end of the base at which the striker is held in latched position. This is considered an animal bait stealing approach since the animal by virtue of being located at the rear end of the base escapes the striker as it rotates into its released position. Specifically the striker rotates over the top of the animal or knocks the animal to one side so that the animal is not pinned between the jaw and the base.

It is an object of the present invention, therefore, to provide improved facilities for minimizing the stealing of bait from the bait treadle of an animal trap.

It is another object of the invention to provide an improved barrier structure, readily attachable to animal traps of standard commercial design, which acts to interfere with animal approach to the bait treadle from the rear end of the trap base, without interfering with operation of the trap when sprung.

According to a further object of the invention, the barrier structure is so constructed that it may be supported upon the trap in a lowered position wherein the overall thickness of the trap is not increased.

In accordance with another object of the invention, facilities are provided for automatically pivoting the barrier from its lowered position to a raised animal approach blocking position relative to the trap base as the striker or jaw is pivoted into its set position relative to the trap base.

2

It is a still further object of the invention to provide a barrier structure of the character described which is so simple, stamped-out, one-piece metal construction and may be easily manufactured at low cost in production quantities.

The invention, both as to its organization and method of operation, together with further objects and advantages thereof, will best be understood by reference to the following specification taken in connection with the accompanying drawings, in which:

Fig. 1 is a perspective view illustrating the present improved barrier structure prior to combination with an animal trap;

Fig. 2 is a top plan view of an animal trap having combined therewith the present improved barrier structure;

Fig. 3 is a side view of the trap shown in Fig. 2 illustrating the barrier in its raised or upright position relative to the trap base;

Fig. 4 is a sectional view taken along the lines 4—4 in Fig. 2; and

Fig. 5 is a perspective view illustrating the operative connection between the barrier and the spring of the trap.

Referring now to the drawing and more particularly to Fig. 1 thereof the present improved barrier structure is there indicated generally at 10 as comprising a body portion 10a having spaced supporting portions 10b and 10c extending laterally from the lower edge thereof which are adapted to be wrapped around the spaced sections of the coil spring used in a rat or mouse trap to actuate the trap striker assembly, thereby to provide a pivotal support for the barrier. Intermediate the supporting portions 10b and 10c, the body portion of the barrier is provided with an inverted V-shaped notch 10d within which one or more parts of the trap latching mechanism are freely movable. Along its side edges, the barrier is provided with oppositely projecting portions 10e and 10f which are employed in pivoting the barrier to an upright animal approach blocking position, and in limiting such pivotal movement of the barrier in the manner explained below.

The barrier 10 is preferably of thin gauge sheet metal construction and in the manufacture thereof may be formed by two simple stamping operations, the first being that of stamping out the barrier blank of desired size and pattern from flat metal stock. Thereafter, a second stamping operation may be used to bend the supporting portions 10b and 10c at right angles to the barrier body portion 10a along the line 10i, so that they occupy the full line positions shown in Fig. 1 of the drawing. Following this operation, the barrier structure is ready for combination with the operating mechanism of a trap of appropriate size. This may be accomplished in the manner explained below with reference to Figs. 2, 3 and 4 of the drawing.

Briefly, the trap there shown is of the self-setting type and comprises a base 11 preferably in the form of a wood block of rectangular shape. Intermediate the front and rear ends thereof, this base pivotally supports a U-shaped striker 12 formed of relatively stiff wire bent intermediate its ends at 13 to provide a cross portion 14 and side portions 15 pivoted at their ends upon a pivot element in the form of a rod or nail 16 which extends through two staples 17 driven into the wood base. The striker is constantly urged toward its released position shown in dotted lines in Fig. 3 of the drawing by means of a coil spring 18 composed of a wire member having two spirally wound sections 19 surrounding the pivot pin 16. These coil sections are connected at adjacent ends by an integral loop part 21 which bears upon the wood base in the manner shown in Figs. 2 and 3 of the drawing. The outer end portions 22 of the coil spring are extended for engagement over or within loop parts 23 of the striker side portions 15, the arrangement being such that tension stored in the spring tends to rotate the striker from its set position to its released position.

For the purpose of releasably holding the striker 12 in its set postion, latching means are provided which comprise a bait holder or treadle 24 also pivoted upon the pin 16. This bait or treadle member extends toward the front end of the base 11 and consists of a piece of sheet metal bent throughout its major part to U-section, the pivot pin passing through suitably provided apertures in the vertical or leg parts 26 of the treadle. At its front end, the treadle 24 is enlarged at 27 and provided with a depressed tang 28 to hold the bait. From just rearwardly of the pivot pin 16, the central part of the U-portion of the treadle member is cut away to provide a slot 29 for receiving a latching bar 30, and a forward holding shoulder 31 which may be engaged by the swing end of the latching bar to hold the striker 12 in its set position.

A latch holder 32 is provided at the rear end of the base 11 to support the latching bar 30 at one end thereof for limited universal movement. This holder is preferably constructed of sheet metal, is of U-shaped cross section and is provided with legs driven into the base 11. A central slot extends down the vertical base portion of the holder 32 to receive the end parts 30a, 30b and 30c of the latching bar 30. This slot is interrupted by a bridge member 37 extending through the partially closed slot 41 between the latching bar end parts 30a and 30b.

More specifically, the latching bar 30 consists of a single flat piece of sheet metal provided at its rear end with two slots 41 and 42 which separate the end parts 30a, 30b and 30c. Above the slot 42 the end part 30c is formed in the latching bar 30 to hold the cross portion 14 of the striker 12 when the striker is in its set postion. Setting of the trap is accomplished by pivoting the striker 12 from the position shown in dash lines in Fig. 3 of the drawings in a counterclockwise direction until it engages the latching bar end part 30b. The end part 30c is so dimensioned that with the swing end of the latching bar 30 resting upon the loop 21, the cross portion 14 of the striker readily clears the end of the part 30c. Due to engagement of the striker cross portion 14 with the latching bar end part 30b, slight further movement of the striker 12 causes the latch bar 30 to swing up about its pivotal connection with the latch holder 32 until its swing end is above the shoulder 31 of the treadle 24. As the latching bar 30 is thus pivoted in a counterclockwise direction as in Fig. 3 to raise the swing end thereof, the camming edge 30d provided at this end of the bar engages the edge of the shoulder 31 to pivot the treadle slightly in a clockwise direction. As the bottom edge of the bar is raised above the shoulder 31, the treadle 24 is reversely pivoted under the influence of gravity by virtue of its center of gravity being disposed to the left of the pivot rod 16. During such reverse pivotal movement, the shoulder 31 is moved into the path of movement of the lower edge of the latching bar 30. Thus, the swing end of the bar is held in a raised position to project the end part 30c outwardly from the rear end of the holder 42 and thus prevent the striker 12 from returning to its released position under the influence of the spring 18. The spring 18 acting through the striker 12 and the end part 30c of the latching bar serves positively to hold the swing end of this bar in engagement with the shoulder 31 of the treadle 34 until such time as the treadle is tripped.

When the trigger 24 is moved away from the position shown in Fig. 2 of the drawing, the swing end of the latching bar 30 is disengaged from the shoulder 31 permitting this bar to rotate in a clockwise direction under the influence of the spring 18 until it engages the spring loop 21. As such pivotal movement occurs, the end part 30c of the latching bar 30 is retracted, thus freeing the cross portion 14 of the striker to permit swinging movement of the striker to its released position under the influence of the spring 18.

Referring now more particularly to the manner in which the present improved barrier 10 is combined with the self-setting trap just described, it is pointed out that the parts 10b and 10c of the barrier are utilized in pivotally supporting the barrier upon the coil spring sections 19. Specifically, and with the striker 12 in its released position, the supporting portions 10b and 10c may be slipped beneath the coil spring sections 19 and wrapped around these sections to provide the desired pivotal support for the barrier. This may be accomplished either by finger or instrument binding of the parts 10b and 10c about the coil spring sections. After the barrier is thus assembled with the trap, it may be rotated to a lowered position wherein the body portion 10a thereof is in substantially the same plane as the top surface of the bait treadle 24. Thus, the overall thickness of the trap is not increased as a result of assembly of the barrier therewith. This is an important consideration in the factory production of barrier equipped traps which must be packaged for shipment, since the inclusion of the barrier in the trap structure does not increase the packaging space required or require the use of non-standard cartons.

As indicated above, in accordance with one feature of the present invention, a one-way actuating connection is provided between the striker 12 and the barrier 10 for automatically rotating the barrier 10 to its upright position relative to the base 11 incident to pivotal movement of the striker 12 toward its set position. Thus, with the barrier supported between the side portions 15 of the striker 12, the projecting portions 10e and 10f thereof are so positioned that the upper edges 10g and 10h lie in the paths of movement of the coil spring end portions 22. Accordingly, as the striker 12 is rotated from its released position to its set position, the spring end portions 22 engage the projection edges 10g and 10h to rotate the barrier 10 from its lowered position adjacent the base 11 to an upright position wherein it is disposed substantially at right angles to the base as shown in Fig. 5. With the barrier 10 in this position, no parts thereof are disposed in the path of movement of the striker 12 toward its released position. Thus the striker is free for unimpeded movement to its released position when the bait treadle is tripped.

The projecting portions 10e and 10f of the barrier also have the function of preventing the barrier 10 from being rotated through the desired upright position. To this end, the lower edges 10m and 10n are adapted to engage the staple supports 17 incident to movement of the barrier 10 into an upright position relative to the base 11. Such engagement obviously prevents continued movement of the barrier 10 in a counterclockwise direction relative to the base 11. Thus with the striker 12 occupying its set position, the barrier 10 is positively locked against pivotal movement in either direction relative to the base 11.

From the foregoing explanation it will be understood that with the barrier 10 in its raised or upright position, the animal approach to the baited end 27 of the treadle 24 from the rear end of the base 11 is effectively blocked. In this regard it is noted that the height of the body barrier portion 10a is so related to the length of the striker side portions 15 that even an animal of small size lying partially across the top edge of the barrier body portion 10a will be brushed off of the barrier by the cross portion 14 of the striker when the bait treadle is tripped to release the striker latching mechanism. In such case the animal will normally be carried with the striker 12 against the base 11 and pinned between the two named elements. Thus the present improved barrier structure substantially prohibits bait stealing occasioned by animal approach to the baited end of the treadle 24 from the rear end of the base 11.

From the above explanation it will be understood that the present invention affords a substantially complete solution to the problem of bait stealing of the type referred to herein. Moreover, the structure of the barrier 10 utilized to prohibit such stealing is of simple and economical construction and may be easily combined with the operating parts of a trap of appropriate size. In this regard it is pointed out that the barrier 10 may either be manufactured as a component part of a trap prior to shipment for sale, or may be manufactured and sold separately for attachment to traps of conventional design.

While there has been described what is at present considered to be the preferred embodiment of the invention, it will be understood that various modifications may be made therein which are within the true spirit and scope of the invention as defined in the appended claims.

I claim:

1. A barrier adapted for support upon the coiled striker biasing spring of an animal trap to block one animal approach to the bait treadle of the trap, comprising a body portion adapted to extend upwardly from the trap base to provide the approach barrier, and support means adapted to be wrapped around the coiled striker biasing spring to provide a pivotal support for said body portion.

2. A barrier adapted for support upon the coiled striker biasing spring of an animal trap to block one animal approach to the bait treadle of the trap, comprising a metal member having a body portion adapted to extend upwardly from the trap base to provide the approach barrier, support portions adapted to be wrapped around the coiled striker biasing spring to provide a pivotal support for said body portion and oppositely extending projecting portions cooperable with parts of the striker assembly to pivot said body portion into an upright position relative to the trap base and to hold said body portion in said upright position.

3. An animal trap comprising a spring biased striker, means pivotally supporting said striker for movement between set and released positions, latch mechanism including a bait treadle for holding said striker in its set position, and a barrier pivotally supported by said supporting means out of the path of movement of said striker into its released position for at least partially blocking animal approach to said treadle from one direction.

4. An animal trap comprising a spring biased striker including spaced side portions, means pivotally supporting said striker for movement between set and released positions, latch means including a bait treadle for holding said striker in its set position, and a barrier pivotally supported between said striker side portions out of the paths of movement thereof during movement of said striker from its set position to its released position, said barrier being operative to at least partially block animal approach to said treadle from one direction.

5. An animal trap comprising a base, a spring biased striker including spaced side portions and pivotally supported upon said base intermediate the front and rear ends thereof for movement between set and released positions, latch means for holding said striker in its set position and including a bait treadle extending toward the front end of said base, a barrier disposed between said striker side portions for at least partially blocking animal approach to said treadle from the rear portion of said base, and means pivotally supporting said barrier for movement between raised and lowered positions relative to said base.

6. An animal trap comprising a base, a spring biased striker including spaced side portions, means pivotally supporting said striker upon said base intermediate the front and rear ends thereof for movement between set and released positions, latch means for holding said striker in its set position and including a bait treadle extending toward the front end of said base, and a barrier pivotally supported upon said supporting means between said striker side portions for movement between raised and lowered positions relative to said base, said barrier being effective to at least partially block animal approach to said treadle from the rear end of said base.

7. An animal trap comprising a base, a striker including spaced side portions and a cross portion, means including a pivot element extending transversely of said base intermediate the front and rear ends thereof for supporting said striker for pivotal movement between set and released positions, a helical coil spring biasing said striker toward its released position and having convolutions surrounding said element, latch means for holding said striker in its set position and including a bait treadle extending toward the front of said base, and a barrier including at least one portion wrapped around said spring convolutions to support the barrier between said striker side portions for pivotal movement between raised and lowered positions relative to said base, said barrier being effective to at least partially block animal approach to said treadle from the rear end of said base and being so supported between said striker side portions as not to interfere with movement of said striker from its set position to its released position.

8. An animal trap comprising a spring biased striker pivotally supported for movement between set and released positions, latch mechanism including a bait treadle for holding said striker in its set position, and a barrier supported for movement into a position for at least partially blocking one animal approach to said treadle in response to movement of said striker toward its set position.

9. An animal trap comprising a base, a spring biased striker pivotally supported upon said base for movement between set and released positions, latch mechanism including a bait treadle for holding said striker in its set position, and a barrier supported upon said base for pivotal movement from a lowered position relative to said base to an upright position relative to said base in response to movement of said striker toward its set position, said barrier being effective to at least partially block one animal approach to said treadle when occupying its upright position relative to said base.

10. An animal trap comprising a base, a spring biased striker, means pivotally supporting said striker upon said base for movement between set and released positions, latch mechanism including a bait treadle for holding said striker in its set position, and a barrier supported upon said supporting means for pivotal movement from a lowered position relative to said base to an upright position relative to said base in response to movement of said striker toward its set position, said barrier being effective to at least partially block one animal approach to said treadle when occupying its upright position.

11. An animal trap comprising a base, a spring biased striker provided with side portions, means pivotally supporting said striker upon said base for movement between set and released positions, latch mechanism including a bait treadle for releasably holding said striker in its set position, a barrier supported upon said supporting means between said striker side portions for pivotal movement from a lowered position relative to said base to an upright position relative to said base, and means providing a one-way actuating connection between said striker and said barrier for operating said barrier to its upright position in response to movement of said striker toward its set position and for permitting unimpeded movement of said striker from its set position toward its released position, said barrier being effective to at least partially block one animal approach to said treadle when occupying its upright position.

12. An animal trap comprising a base, a striker including side portions and a cross portion, means including a pivot element extending transversely of said base intermediate the front and rear ends thereof for supporting said striker for pivotal movement between set and released positions, a coil spring biasing said striker toward its released position and having convolutions surrounding said element, latch means for releasably holding said striker in a set position and including a bait treadle extending toward the front end of said base, a barrier including a portion wrapped around said spring convolutions to support the barrier between said striker side portions for pivotal movement between raised and lowered positions relative to said base, said barrier being effective to at least partially block animal approach to said treadle from the rear of said base and being so supported between said side portions as not to interfere with movement of said striker from its set position to its released position, and means providing a one-way actuating connection between said striker and said barrier for operating said barrier to its upright position in response to movement of said striker from its released position toward its set position.

13. An animal trap comprising a base, a striker including side portions and a cross portion, supports spaced transversely of said base intermediate the front and rear ends thereof and anchored to said base, means including a pivot element extending between said supports for supporting said striker upon said supports for pivotal movement between set and released positions, a coil spring biasing said striker toward its released position and having convolutions surrounding said element, latch means for releasably holding said striker in a set position and including a bait treadle extending toward the front end of said base, a barrier including a portion wrapped around said spring convolutions to support the barrier between said striker side portions for pivotal movement between raised and lowered positions relative to said base, said barrier being effective to at least partially block animal approach to said treadle from the rear of said base and being so supported between said side portions as not to interfere with movement of said striker from its set position to its released position, and means providing a one-way actuating connection between said striker and said barrier for operating said barrier to its upright position in response to movement of said striker from its released position toward its set position, said barrier having oppositely extending portions engageable with said supports to stop movement of said barrier after it is pivoted to its upright position.

14. An animal trap comprising a base, a striker including side portions and a cross portion, supports spaced transversely of said base intermediate the front and rear ends thereof and anchored to said base, means including a pivot element extending between said supports for supporting said striker upon said supports for pivotal movement between set and released positions, a coil spring having convolutions surrounding said element and end portions engaging said striker arm side portions to bias said striker toward its released position, latch means for releasably holding said striker in a set position and including a bait treadle extending toward the front end of said base, a barrier including a portion wrapped around said spring convolutions to support the barrier between said striker side portions for pivotal movement between raised and lowered positions relative to said base, said barrier being effective to at least partially block animal approach to said treadle from the rear of said base and being so supported between said side portions as not to interfere with movement of said striker from its set position to its released position, said barrier being provided with oppositely extending portions engageable by said spring end portions to pivot said barrier to its upright position in response to movement of said striker from its released position toward its set position, said oppositely extending portions of said barrier also being engageable with said supports to stop pivotal movement of said barrier after it is pivoted to its upright position.

HERBERT A. STILSON.

REFERENCES CITED

The following references are of record in the file of this patent:

UNITED STATES PATENTS

| Number | Name | Date |
| --- | --- | --- |
| 595,741 | Streeter | Dec. 21, 1897 |